(No Model.)
H. T. SIDWAY.
BISCUIT CUTTER.
No. 475,815. Patented May 31, 1892.
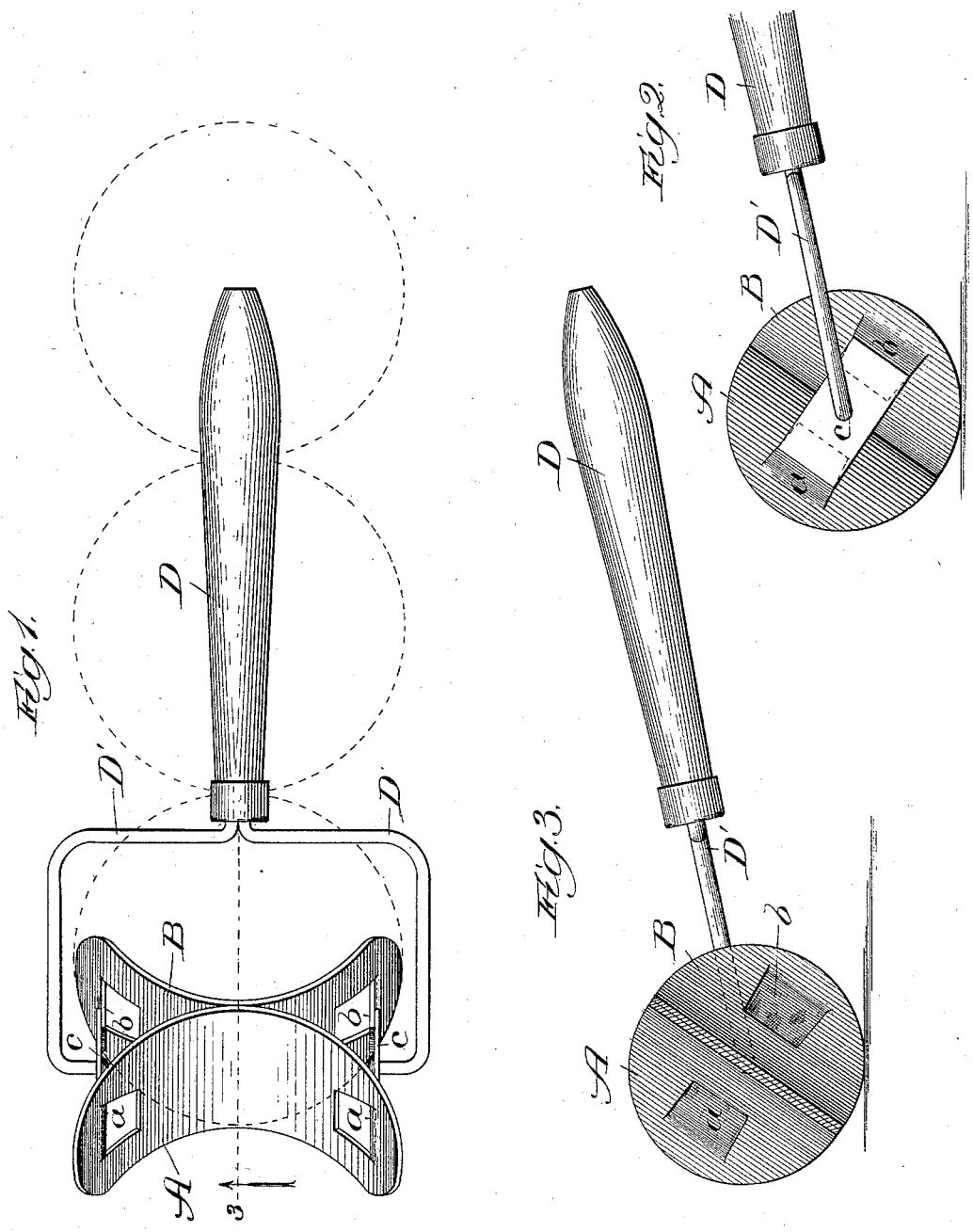
Witnesses:
Chas. E. Gaylord
Clifford H. White
Inventor:
Henry T. Sidway,
By Banning & Banning & Payson,
Att'ys

UNITED STATES PATENT OFFICE.

HENRY T. SIDWAY, OF CHICAGO, ILLINOIS.

BISCUIT-CUTTER.

SPECIFICATION forming part of Letters Patent No. 475,815, dated May 31, 1892.

Application filed September 9, 1891. Serial No. 405,195. (No model.)

*To all whom it may concern:*

Be it known that I, HENRY T. SIDWAY, a citizen of the United States, residing at Chicago, Cook county, Illinois, have invented certain new and useful Improvements in Biscuit-Cutters, of which the following is a specification.

The object of my invention is to provide a simple revolving cutter for cutting cake, biscuit, &c., and which is preferably so constructed that two biscuits are formed at each revolution of the cutter.

While I shall describe my invention as applied to biscuits and term the same in the specification and claims a "biscuit-cutter," I wish it to be distinctly understood that I do not limit myself to its use in cutting biscuits solely, since I contemplate employing it to cut biscuit, cake, and dough in any form, as well as any other material which is capable of cutting, and shall only use the word "biscuit" for the sake of simplicity and to avoid unnecessary repetition, there being no one word which will satisfactorily cover all of the uses to which my cutter can be applied.

My invention consists in the features and details of construction hereinafter described and claimed.

In the drawings, Figure 1 is a plan view of one form of cutter embodying my improvements; Fig. 2, an end elevation of the cutter and a portion of the handle; and Fig. 3 a section on line 3 of Fig. 1, looking in the direction of the arrow.

When made in the form shown in the drawings, the cutter is formed out of two pieces of tin or other suitable material A and B. These pieces are substantially elliptical in shape and are bent in a suitable arc, as shown, the convex sides being adjacent to each other and the pieces being preferably fastened together. A portion of each piece is partially cut away, as shown, the tongues *a a* and *b b* so separated being bent back, as shown in the drawings, the tongue on one piece being connected to the tongue on the other piece by means of plates C of suitable material. These plates C form a connection between the revolving part of the cutter and the handle D. This handle is provided with two arms or prongs of wire or other suitable material D', which are inserted into the handle, as shown, and are then bent, preferably, into the form shown in Fig. 1, one arm being connected with the plate C at one end of the cutter, and the other arm with the corresponding plate at the other end. In the preferred manner of constructing the cutter the two plates A and B are first made and fastened together with the tongues *a* and *b*, cut and bent outward. The plates C are then secured to the arms of the handle and soldered onto the tongues *a* and *b*, as shown.

The advantages of cutting away a portion of the two parts of the cutter A and B in the manner and at the place indicated are twofold, first, a convenient means of rotatably mounting the cutter is provided, and, second, any compression on the edge of the biscuit is avoided by leaving an opening at this place in the cutter.

In operation the cutting-plates A and B are pressed against the dough, pastry, or other material to be cut and the cutter moved by its handle over the same. This causes the cutter to revolve, and as it does so the plates A and B cut a circular cake or biscuit, as indicated by the dotted lines in Fig. 1. By this means any number of biscuits can be cut at a single operation of the cutter, the only limit being the extent of the dough or other material out of which the biscuits, &c., are to be cut. The cutter is light, rapid, and efficient, doing away with the repeated applications of the non-revoluble cutters heretofore in use.

In the drawings I have shown my improved cutter as adapted to make circular cake or biscuit; but I have only done this to illustrate one form of cutter, since it is obvious that by changing the shape of the plates biscuits of oval and other forms may be made, as desired, and I do not confine myself to the two plates or to cutting two biscuits at each revolution, as I may increases the number of plates and cuts with each revolution, or may make the cutter out of one piece of iron, steel, or other suitable metal suitably shaped, and I contemplate the necessary changes of form to adapt the cutter to these purposes.

While I have described more or less precise forms, I do not intend to limit myself thereto, but contemplate changes in form and proportion and the substitution of equivalent members, as may be necessary or desirable. For example, a separate handle D is not necessary, since the arms D', if made of wire, can be wound around each other to form a handle. It is not essential that the two parts of the cutter be fastened together independently of the bearing, nor is it essential to cut away a portion of the parts of the cutter, since the bearing-plate C can be secured directly to such parts, or the handle can be movably secured to the cutter in some other manner.

While I have shown this cutter as made of two pieces of metal suitably shaped, bent, and secured together, it is obvious that, if desired, it might be cast in a single piece of suitable shape, corresponding to the shape of the biscuits desired to be cut. When cast in a single piece and adapted to cut two circular biscuits, this cutter would not vary substantially in appearance from that shown in the figures of the drawings, it being obvious that it would make no difference in the form or operation whether the cutter was made in a single piece or in two separate pieces afterward fastened together. While, therefore, in the first claim I have referred to my cutter as comprising two curved elliptical plates, I do not intend to limit myself thereby to a cutter composed of separate plates secured together, but intend the language of this claim to apply to a cutter when made substantially in the form shown in the drawings, whether made in two separate pieces secured together or cast in a single piece of substantially the same form, since such single piece would have the two members or plates A and B.

The cutter may be operated by one hand or both hands or by power, as desired, and similar changes may be made without departing from the spirit of my invention, which consists in providing a revoluble cutter adapted to form biscuit, cake, &c., into different shapes, as desired.

I claim—

1. A biscuit-cutter comprising two curved elliptical plates rotatably supported, substantially as described.

2. A cutter comprising two curved elliptical plates fastened together on their convex sides and rotatably supported in a suitable frame, substantially as described.

3. The combination of a handle provided with arms, a cutter consisting of two curved plates secured together, a portion of such plates being partially cut away and bent inward, and journal-plates rigidly secured to such portions and rotatably secured to the arms of the handle, substantially as described.

HENRY T. SIDWAY.

Witnesses:
GEORGE S. PAYSON,
SAMUEL E. HIBBEN.